United States Patent [19]

Linton et al.

[11] 4,055,667
[45] Oct. 25, 1977

[54] ANIMAL FEEDS

[75] Inventors: John H. Linton; William J. Esdale, both of Beaconsfield; John Viscount Cross, Saskatoon, all of Canada

[73] Assignee: Ogilvie Mills Ltd., Montreal, Canada

[21] Appl. No.: 637,129

[22] Filed: Dec. 3, 1975

[51] Int. Cl.$^2$ ............................................. C12C 11/18
[52] U.S. Cl. .................................... 426/62; 426/630; 426/656; 426/658; 426/807
[58] Field of Search ..................... 426/2, 62, 656, 635, 426/630, 807, 69, 658

[56] References Cited

U.S. PATENT DOCUMENTS

| 3,862,337 | 1/1975 | Osborne | 426/807 |
| 3,895,117 | 7/1975 | Backlund | 426/807 |
| 3,901,976 | 8/1975 | Roth et al. | 426/807 |

Primary Examiner—Raymond N. Jones
Assistant Examiner—R. B. Penland
Attorney, Agent, or Firm—Virgil H. Marsh

[57] ABSTRACT

A liquid animal feed supplement. The liquid feed supplement, which is gravitationally stable for prolonged periods of time, comprises essentially a colloidal mixture of spent brewers' yeast and a water dispersible water-binding agent in an aqueous alcoholic medium.

17 Claims, No Drawings

ANIMAL FEEDS

FIELD OF INVENTION

The present invention relates to novel liquid feed and feed supplements for animals, and to a novel process for preparing same. In more detail the present invention is concerned with the feeding of ruminant and monogastric animals such as cattle, poultry, hogs, sheep, horses and rabbits. Of particular importance are dairy and beef cattle.

BACKGROUND OF INVENTION

In simple terms, animals such as cattle may be considered as processors of raw materials to a desired end product, namely, the conversion of feed to food, such as meat, milk, etc. In modern times, with increasing costs of animal feed, great effort is being expended to increase the efficiency of conversion of the feed to the desired product by the animal. The basic aim is to provide the animal with a totally balanced diet, i.e. with a daily ration which contains (a) the maximum amount of protein (natural or otherwise) and other essential nutrients which the animal is able to use beneficially, i.e. convert into desired products and utilize to sustain its normal life-sustaining functions and (b) sufficient energy-providing materials to enable the animal to effect the desired conversion to maximize its physical and economic efficiency in converting feed to food. It should be noted that the ration may be deficient, i.e. either lacking in energy-providing materials, in which case the animal is not able to optimally utilize the other components of the feed, or there may be an excess of energy-providing materials, caused for example, by insufficient protein in the ration, and in both cases the rate/degree of feed conversion will obviously suffer. Moreover, there is obviously a limit as to how much conversion an animal may effect in a set period of time, and providing feed over and above that required to effect the maximum possible feed conversion is wasteful and uneconomic. However, the amount and nutritional quality of the feed material available to the farmer from his own resources is generally fairly restricted. It is therefore common for the farmer to be assisted by an animal nutritionist whose task it is to formulate a ration which will provide the animals with all the material necessary to enable them to achieve maximum feed conversion most economically. Ideally, the calculated ration will utilize as far as possible the feed material the farmer has readily available to him and nutritional deficiencies therein are corrected by adding thereto an animal feed supplement containing the deficient nutritional components. Many such feed supplements are available to the farmer and contain, for example, protein, natural or N.P.N. (such as urea), carbohydrates, fats; vitamins such as vitamins A, B, C, D and E, and many trace elements such as calcium, phosphorous, copper, etc. The presently available prior art feeds are usually solids, solutions or slurries. In general, solid supplements are not as convenient as liquid supplements which may be conveniently pumped and are generally easier to handle. In the case of slurries, it is essential that the farmer have available to him on the farm, mixing apparatus for reforming the slurries into a homogeneous mixture before the feed is given to the animals. If this is not effected, and a non-homogeneous mix is given to the animals, there is a risk that some animals will obtain a "weak" feed, i.e. their diet will be deficient in some components, which is obviously undesirable, but a more real danger is that some animals would be fed an overrich diet which may result in their being poisoned or otherwise injured by the excess of certain materials. On the other hand, since some essential food ingredients are insoluble in an aqueous medium, supplements which are pure solutions usually need to be used in combination with a further, and solid, supplement. In the past, attempts to formulate supplements in suspension form have not proved commercially successful because, inter alia, gravitationally stable suspensions having a suspended solids content of a high enough value from a commercially practical viewpoint have not been attainable.

Additionally, the protein content, i.e. natural protein content, in known liquid feed supplements is obtained from many sources, such as fish solubles, fermentation solubles and dried brewers' yeast. In recent times there has been much investigation into the use of such materials because these are presently available in large amounts as industrial by-products. Of particular interest in the present instance is brewers' yeast. In the brewing process when fermentation has ceased, the fermenter vessel contents are cooled resulting in the yeast settling to the bottom of the vessel. The supernatant beer is transferred to storage and the yeast removed as a slurry in (green) beer, i.e. in aqueous alcohol. In the past this material has generally been converted into the corresponding dried product. However, there have been some attempts to use this material in wet slurry form—see for example, an article by Dr. J. H. Linton entitled, "Utilization of Brewery By-Products as Livestock Feed" in the Master Brewers' Association of America Technical Quarterly, Vol. 10, No. 4, 1973 and Canadian Pat. No. 959,332. However, for various reasons there has not been widespread utilization of yeast slurries, although recent significant progress has been made in this area —refer to copending application Ser. No. 637,127, filed on Dec. 3. 1975 in the name of J. D. Harvey and R. C. Chalk, assigned to the present assignees, which discloses a liquid animal feed supplement comprising a specially treated form of spent brewers' yeast. As discussed in the specification of that copending application, the novel supplement has significant advantages over known liquid supplements. However, it still suffers from the disadvantage that the individual user must have mixing equipment available to ensure homogenization of the supplement prior to its being offered to the animals, generally by being applied to the roughage of the ration. If necessary, other components of which the ration is deficient are offered separately to the animals.

STATEMENT OF INVENTION

It has now been found that a combination of spent brewers' yeast and a water-dispersible water-binding agent will form a colloidal suspension in an aqueous alcoholic medium into which the other feed components may be incorporated and the resulting supplement having the form of a colloidal mixture is surprisingly gravitationally and microbially stable.

Throughout this specification the term "gravitationally stable" means stable, by the test hereinafter described, for a period of at least 30 days.

The supplements of the present invention typically have a solids content of from 32.5 to 45% by weight, based on the total supplement, whilst still remaining stable and convenient to handle by conventional pumping equipment etc. Indeed, the solids content has been found to be very important since too low a solids content, say below about 30% solids, has been found to result in the formation of a gravitationally unstable supplement. Moreover, too high a solids content, say over about 50% solids, has been found to produce supplements which do not have the required convenient handling characteristics such as pumpability. The novel supplements therefore have a solids content within the range of from 30 to 50% solids. It should be noted that the major portion, generally well over 85% of the solids content is present in the novel supplement as a dispersed phase. The novel supplement comprises up to about 12.5%, usually from 2 to 10% and especially from about 5 to about 8% by weight, calculated as dry matter, of yeast.

It is advantageous to use in the production of the novel supplement, brewers' spent yeast in slurry form obtained as mentioned previously, as a by-product in the production of alcoholic beverages. The yeast is usually destroyed, preferably by a highly advantageous novel treatment with an acid, preferably an inorganic acid, this process being described in detail in said co-pending application Ser. No. 637,127, filed on Dec. 3, 1975, in the name of John D. Harvey and Ronald C. Chalk, the disclosure of that specification being incorporated herein by reference. In that process the yeast slurry, preferably having a yeast content of from 7.5 to 20% by weight is treated with an acid such as sulphuric acid and/or phosphoric acid, in an amount of from 1 to 6% by weight and yeast kill is preferably substantially complete within about 24 hours. The process is effected at relatively low temperatures and it is believed that yeast components such as vitamins, which are highly desirable components in an animal feed, remain substantially unaffected. Moreover, since the yeast is slurried in green beer, although the alcoholcontent in the liiquid supplement is low, the odour and taste imparted to a supplement may well assist in making same appetising to the animals.

The novel supplements of the present invention include at least one component which provides additional advantageous colloidal water-binding capacity. This component may be an additive included in the supplement solely for that purpose, an example thereof being an attapulgite clay (hydrous magnesium aluminium silicate) such as the material available under the trade mark Min-u-gel (such as Min-u-gel 200) from Imperial Molasses Co., Strathern Avenue,, Pier 23, Hamilton, Ontario.

However, it has been found that in many instances one or more of the additives included in the novel supplement for their nutritional value have the desired water-binding capacity and in such cases, it is not necessary to include a special additive to provide this effect. Examples of such additives are soybean meal or corn gluten meal which are included in the supplement for their natural protein contribution to the supplement and which have been found to fulfil this function admirably.

The present supplement, utilizing as it does a variety of natural materials, will in many instances contain more than one component which contributes in some degree to the water-binding capacity of the whole supplement. It is difficult therefore, from a practical viewpoint to strictly define the required total water-binding capacity of the components of the novel supplement. However, from tests on supplements of the present invention formulated to contain only one component having a water-binding capacity, it has been determined that certain effective minimum and maximum amounts of each such component, when used alone, are necessary to obtain the required gravitational stability in the manufactured supplement; required equivalent amounts of some specific components are detailed in the following Table A:

TABLE A

| Component | Minimum | Maximum |
|---|---|---|
| | % By Weight | |
| Corn Gluten Meal | 25.0 | 40.0 |
| Dried Wheat Solubles | 17.5 | 30.0 |
| Soybean Meal | 12.5 | 17.0 |
| Min-u-gel | 0.25 | 7.0 |

These figures show that whilst the minimum amount of proteinaceous component required to provide the necessary water-binding capacity is generally over 10% by weight, the maximum amount varying fairly widely depending on each specific component, the amount of an agent used specifically for that purpose, such as Min-u-gel, is much lower, being effective at values as low as 0.25% by weight with a possible maximum of 7% which is significantly below the minimum of about 10% referred to above.

As stated, the above values are approximate minimum/maximum amounts required to obtain the promise of the present invention if the said components are the sole water-binding agent present. However, from a practical viewpoint, the novel supplement will generally contain a plurality of water-binding components and the sum of the water-binding capacity of all such components must be taken into account. Moreover, if alternative agents are to be used to provide the desired water-binding capacity, or further components to be included in the supplement for nutritional purposes also some have such capacity, the amount of the former required, or the water-binding capacity of the latter to be taken into account, is easily determined using simple comparison tests, the values given above for selected components when used alone forming the basis for the comparison.

Moreover, it has been found highly convenient to use a combination of an agent such as Min-u-gel and at least one proteinaceous material to provide the required water-binding capacity. In this way the type and/or amount of proteinaceous component can be varied at will to obtain maximum economic benefit as regards cost, availability etc. and the water-binding capacity adjusted to the required value by a minor adjustment to the amount of the Min-u-gel type agent in the combination. In this connection due to the relatively greater water-binding capacity of the agent such as Min-u-gel compared with the capacity of the primarily nutritional component, a minor change in the amount of the former is able to compensate for relatively radical changes in the amount and/or type of the said proteinaceous material. When used in such combinations, the Min-u-gel or like agent wil constitute from 0.25 to 2% by weight of the supplement. This flexability is very advantageous when one considers that the proteinaceous materials utilized are, in many cases industrial by-products, the readily availability and supply situation of which is relatively uncertain. In any event, care should be taken to ensure that the total water-binding capacity of the supplement, i.e. the sum of all the individual component contributions is sufficient to provide gravitational stability but is not excessive since this could result in the formation of an undesirable non-flowable gel-like product. In practice, this means that the water-binding capacity of each component is taken into account to ensure that the total capacity is equivalent to that provided by an amount of one of the specific agents listed in Table A above falling between the maximum and minimum values given for that specific component.

It has been found by many tests that, a liquid supplement meeting the criteria of the present invention as laid out above will generally have a Brookfield viscosity of from 250 to 7000 cps, usually 750 to 3000 cps at a temperataure of 23° C. Indeed, the supplements generally have a Brookfield viscosity of between 750 and 3000 cps between the temperatures of 0° to 23° C. Also, it is preferred that the novel supplements have a flow rate as determined by the method described hereinafter, of less than 5 minutes at 20° C. The flow rate is important, particularly because of the need for the supplement to be able to flow readily, for example, from storage tanks. It is worth noting that there does not seem to be a direct relation between the viscosity and flow rate of a novel supplement of the present invention.

As stated previously, the suspension medium of the supplement of the present invention is able to maintain in stable suspension, many diverse components or additives and in relatively substantial amounts. Examples of possible additives are:

Energy Sources

Usually carbohydrate materials such as: molasses, usually cane molasses, grains, e.g. corn wheat, barley, oats.
Waste Products: from wood industry, starch industry, baking industry.

Natural Protein Sources

Corn Steepwater;
Soybean meal;
Corn gluten meal;
Feather meal;
Dried wheat solubles;
Animal blood or blood meal;
Fish meal and fish solubles, dry or condensed;
Rape seed meal;
Linseed;
Milling by-products such as from Grain;
Optionally, non-protein nitrogen sources such as urea.

Minor Components

Calcium; conveniently in the form of limestone;
Phosphorous; conveniently as phosphoric acid and its salts; sodium chloride and an antifoaming agent;
Trace elements such as cobalt, copper, manganese, iron, zinc, potassium and magnesium, conveniently in the form of their sulphates or chlorides;
Vitamins such as A, B, D and E.

With regard to the phosphorous component, some difficulty has been experienced when using some phosphoric salts, such as the widely used dicalcium phosphate, which salts are not easily incorporated into the novel supplement. However, it has been found that use of a phosphoric acid/limestone combination, which effectively forms the desired component in situ, does not present such difficulties and is therefore the preferred method of incorporating phosphorous in the supplement. It will be appreciated that this reaction results in evolution of a gas which may tend to cause undesirable foaming during production of the supplement. In any event, the production of foam in the supplement at any time, for example, when transferring same to the farmer's storage tank, is highly undesirable. The inclusion of an antifoaming agent therefore serves to reduce or eliminate these potential difficulties due to foaming.

Stability

A major feature of the novel supplement of the present invention is that, although having a high solids content in excess of 30% by weight, it is gravitationally stable for prolonged periods of time. This desirable characteristic is, of course, in contradistinction to prior art liquid supplements where the suspended solids content is severely limited and is usually below 5% (unless a slurry-type supplement, as discussed previously, is considered). Moreover, the constitution of such solid constituents maintained in suspension is also restricted.

The stability of the novel supplement allows the supplier to deliver to the farmer at relatively long intervals, although the period between deliveries also depends on other factors such as herd size and the capacity of supplement storage tank. In practice, it has been found that the period between deliveries is generally from 5–21 days. However, as will readily be appreciated, there will inevitably be occasions, such as inclement weather conditions especially in winter, when the regularity of the supply period cannot be maintained. Since the novel supplement is stable for at least 30 days, and generally over 40 days, in periods when such circumstances are prone to occur, an extra supply of supplement can be carried in inventory with no fear of deterioration thereof, thus assuring that the diet calculated for the animals can be maintained independently of the adverse conditions.

Gravitational Stability Test

As far as we are aware, there is at present no standard stability test for liquid feed supplements and described below is the test we have desired for this purpose.

A series of test vessels were constructed from a transparent plastic material. The vessels are cylindrical, having a diameter of about 8.5 inches and a height of about 60 inches. Located through the wall of each vessel along a vertical line parallel to the vessel axis are four sampling conduits, spaced 12 inches apart, the lowermost conduit being two inches up from the base of the vessel. Each conduit is sealed with a tap which enables samples to be withdrawn from the vessel as desired.

The test is conducted by introducing the test supplement into a test vessel to a height of 4–6 inches above the uppermost sampling tap. This small head of sample ensures that if some foaming of the sample occurs on its being poured into the vessel, the foam generated will be located above the uppermost sample tap, thereby ensuring that only true representative samples of the test supplement are extracted from all the sample locations.

Stability evaluation is effected by comparing analysis values of the supplement at the commencement of the test with analysis values obtained periodically throughout the duration of the test.

Generally, the parameters evaluated are:
Dry matter content;
Protein content;
Viscosity;
Specific gravity; and
pH In many instances only dry matter content need be evaluated since this is the major indicator of gravitational stability. Samples of the feed supplement are withdrawn from the four sample locations periodically, usually on the 1st, 7th, 14th, 35th and 42nd days, and analyzed as indicated above. The specific procedures used in the analysis are well known to one skilled in the art and further elaboration thereof is not considered necessary.

The test samples are judged "stable" if the value obtained in the periodic analysis does not vary by more than 5% from the corresponding original value for the parameter being evaluated.

In practice, it has been found that the periodic analysis figures for the novel supplement of the present invention alter by less than 2% from the original values even after 42 days storage at ambient temepratures.

In addition to the above, visual simple examination is also effected at similar time intervals to determine if phase separation, an indication of gravitational instability, has occured. Throughout this specification it may be assumed that all test samples were subjected to the visual examination and were found satisfactory unless a report to the contrary is detailed.

Flow Rate Test

This test evaluates flowability of the novel supplements. The test vessel is a cylinder 10 inches high and 16 cm in diameter open at its upper end and closed at its lower end with a funnel having a centre orifice 1.25 cm in diameter. The test comprises introducing 1 liter of sample at 20° C into the vessel and determining the time for the sample to exit the vessel via the funnel orifice.

The novel supplements preferably have a flow rate of less than about 5 minutes.

Approximate flow rates of the supplement formulations using the limits of the components shown in Table A laid out above are as follows:

| Component | Flow Rate (20° C) | |
| --- | --- | --- |
| | Minimum | Maximum |
| Corn Gluten Meal | 15 s. | 8.0 m. |
| Dried Wheat Solubles | 30 s. | 4.0 m. |
| Soybean Meal | 30 s. | 10.5 m. |
| Min-u-gel | 11 s. | 33 m. | s = seconds
m = minutes

From the above data, it can be seen that use of one natural protein material, such as corn gluten meal, alone may not be preferred since at higher levels, the flow rate of the resulting supplement may not be within the desired range. In such case, a blend of proteinaceous materials may be used, whereby a supplement having the required protein content and desired flow rate is attained.

Microbial Stability Test

The supplements of the present invention were also tested visually, by microscopic examination of test samples, for mold growth, an idication of microbial instability. Again, unless otherwise detailed, it may be assumed that all supplements specifically described in this specification were subjected to this test and were found satisfactory unless a report to the contrary is detailed.

Regarding the microbial stability aspect, it must be emphasized that all novel supplements of the present invention should be vented to air when being stored. Storage in closed vessels has been found, in some cases, to be responsible for mold growth in the novel supplements; this is obviously highly undesirable and can be avoided by the simple expediency referred to above.

In addition, as mentioned previously, the novel supplements have an acid pH, and indeed, have a pH below 5 and usually between 3.8–4.4 and such acid pH values also assist in inhibiting mold growth.

Detailed Description of Process

It has been found that simple mixing of the ingredients does not achieve a stable supplement; a high degree of agitation and shear are essential to the production of the novel supplement.

In a process aspect, the present invention provides a process for the production of a novel gravitationally stable liquid feed supplement comprising subjecting an aqueous alcoholic slurry of spent brewers' yeast and a water-dispersible water-binding agent to vigorous agitation and shear for a period sufficient to produce a gravitationally stable colloidal mixture.

The desired supplement will usually contain other componlents as described in detail above, and these may be incorporated into the said slurry prior to or during the mixing process. Components which are sensitive to the mixing conditions, i.e. may be deterimentally affected by the processing conditions, such as liquid vitamins, are conveniently introduced into the mixture just prior to the cessation of the mixing.

The slurry shoud have a solids content of from 30–50%, the major portion thereof being dispersed as mentioned previously. Mixing is continued generally at ambient temperature until a gravitationally stable supplement is obtained and the viscosity thereof will generally be from 250–7000, usually 750–3000 cps at 23° C.

It has been found that suitable mixing/shearing action may be obtained using in-line continuous high shear pipe-line homogenizing mixers either alone or in combination with one or more alternative mixers. Such in-line mixers utilize special high speed rotors which subject the process stream to tremendous mechanical agitation and impact. The process stream is subjected to the high shear forces developed by the rotor tip speed and the close shearing surfaces between the rotor and stator. This type of action has been found suitable to produce the novel supplements of the present invention. Examples of such homogenizers are:

a. The Gifford-Wood 4 inch pipe-line mixer, obtainable from Gifford-Wood Inc., and b. The Speco homogenizer (25 hp)., obtainable from Speco, Beverly, Mass., U.S.A.

Whilst the Gifford-Wood device is also a pump, the Speco device is solely a homogenizer and must be used in combination with a pump to transport material to and from the homogenizer unit.

It is preferred that the dry components of the supplement are thoroughly wetted prior to their being subjected to a shearing action. Conveniently, this is effected by including a primary mixing stage using a further mixer or blender device which may also provide some shearing action. Conveniently, a low-foam producing producing mixer is used to provide the desired mixing action which conveniently involves the creation of a vortex. The solid components are then introduced into the eye of the vortex thus ensuring wetting of the component particles. A suitable mixer is a Turbon. Such mixers in addition to ensuring particle wetting also create an ultra high shear effect in the region of the impeller mixing device so ensuring an efficient homogenization of the solid phase within the suspending liquid phase whilst effecting significant particle size reduction.

In one form of the process therefore, it has been found advantageous to provide two treatments; a first mixing/shear treatment which facilitates thorough wetting of the dry components of the feed and a second treatment which primarily effects high shear treatment. This embodiment will be described in more detail with reference to the following schematic diagrams of suitable apparatus.

An antifoaming agent is included in the formulation to reduce undesirable foaming, produced by both the mixing/shearing action and the release of gas during the mixing. Also, the processor is vented to air during the process to allow the gas to vent to atmosphere.

inch plate has been replaced with a 7 inch plate, the unit being driven by a 15 hp. motor.

Not illustrated are the usual storage tanks, supply hoppers and material transport means (such as pumps, augers, etc.) for the various feed components.

In the simplest form of operation, all the liquid components of the feed supplement, except those which are sensitive to the processing conditions, such as liquid vitamins, are introduced into the processor and stirring is commenced. After a short period of time, the liquid components are admixed and the desired vortex created.

The dry components of the feed are then introduced into the vortex whereupon these are thoroughly wetted by the mixing action.

After a suitable period of time, the recirculation sys-

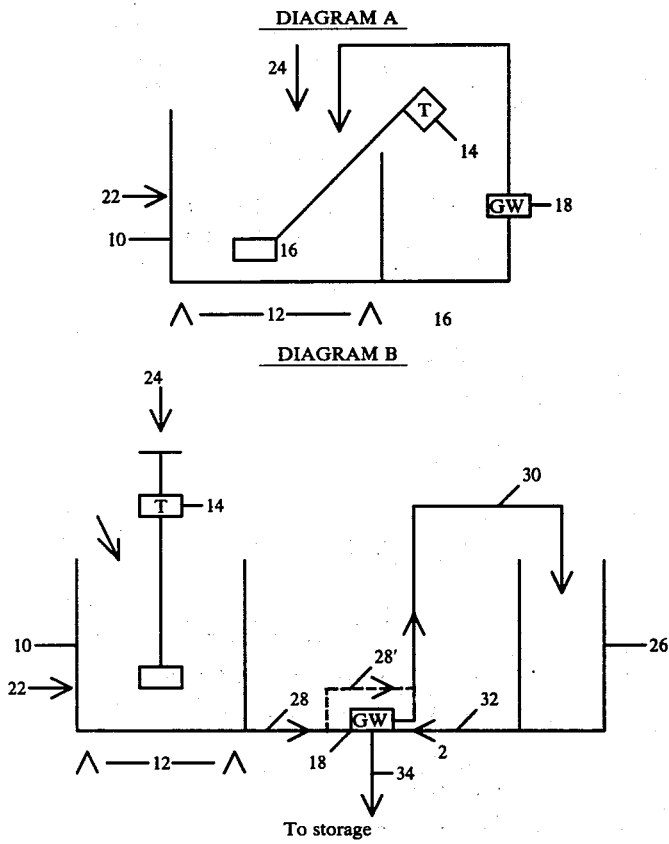

Diagram A illustrates diagrammatically a pilot plant for producing the novel supplement. The plant comprises processor 10 supported on load cells 12. The processor is fitted with a high speed stirring/shearing device 14, the stirring head 16 thereof being positioned in the centre lower portion of the processor 10 in order that the liquid contents of the processor are stirred in such a manner that a vortex is created. The processor 10 is provided with a recirculation system consisting of pipe 16 which conducts fluid from the processor to a high shear homogenizer or mixer 18 and pipe 20 which returns treated liquid to the processor. The processor is also fitted with liquid component supply line(s) 22 and dry component supply line(s) 24, the latter being positioned to introduce the dry components into the vortex created in the liquid content of the processor.

In this pilot plant the homogenizer 18 is the Gifford-Wood device referred to above and the high speed stirrer 14 is the Turbon No. 4 wherein the original 4 tem is brought into effect and maintained for a period sufficient to ensure that substantially all of the processor contents pass at least once through the high-shear mixer 18.

The feed supplement so formed is then pumped through high-shear pump 18 to storage or into a tanker for delivery.

Turning to Diagram B, this illustrates a full scale commercial plant utilizing a processor 10 and a separate holding tank 26. In this instance the mixer 14 is located along the centre vertical axis of the processor, which again ensures creation of the desired vortex.

The mix exits the processor 10 via pipe 28, passes through high-shear mixer 18 and is carried therefrom via pipe 30 into holding tank 26. Alternatively, the high-shear mixer 18 may be by-passed using pipe 28.

The recirculation system comprises a pipe 32 to carry the material from the processor holding tank 18 through the high-shear mixer 18 and via pipe 30, back into holding tank 26. The pipe 32 also transports the mixture from holding tank 26 once more through the high-shear mixer 18 and the finished feed is exited via pipe 34 to storage or transport tankers. Againt the processor is supplied with component supply lines 22 and 24.

In the plant, the mixer 14 is the modified Turbon No. 4. The high shear mixer 18 is the Speco homogenizer referred to above.

The operation of this system is very similar to the pilot plant illustrated in Diagram A with the following two notable exceptions:

1. The improved recirculation/shear system ensures that the whole mixture of components is subjected to more consistent high-shear treatment; and
2. The provision of the holding tank 26 greatly increases the throughput obtainable since preparation of a second batch can be commenced whilst the first batch is being subjected to the recirculation/shear treatment.

As indicated previously, many of the materials, especially proteinaceous materials, used in the present invention are, for the most part, by-products whose specific constitution may vary somewhat even within a batch. The specific degree and amount of mixing/shearing action required to produce the stable novel supplements of the present invention may therefore vary somewhat. However, the required specific conditions may conveniently be obtained from trials.

For example, in one embodiment of the novel process (described in more detail in Example 1 ) the following sequence of steps are carried out:

1. All liquid components (excluding liquid vitamins) are introduced into processor 10 and the processor contents mixed by recirculation through high-shear mixer 18.
2. The dry components are then introduced into the processor whilst the whole contents are mixed;
3. Upon completing the addition, the processor contents are recirculated through high-shear mixer 18 whilst shear mixer 16 continues to function;
4. Liquid vitamins are added just prior to step (5);
5. The product is discharged to storage through high-shear mixer 18.

The total energy consumed by the mixing/shearing steps of the above process was found to be approximately 32.5 KWH and a stable product was obtained. However, if the energy consumed is reduced to approximately 26.6 KWH (by omitting step (5), i.e. further passage through high shear mixer 18), the product was unstable and unsatisfactory.

Taking into account the various energy losses in the pumps etc. and the statistical probabilities of exposure of all of the processor contents to the mixing/shear action of both mixer/shearer, it is concluded that the efficiency of the process is about 65%. Therefore, the energy imparted to the slurry is about 21 KWH and 17.5 KWH respectively, the former producing a satisfactory (stable) product and the latter producing an unstable product. This indicates that an energy input of about 20 KWH is required to produce the novel dairy supplement having the formulation as laid out in detail in Example 1. Further, since the batch size was 4000 lbs. weight, the energy imparted per pound of slurry is about 0.005 KWH/lb. Moreover, similar criteria have been found to be generally applicable to the production of novel supplements of the present invention, and in particular, those specifically detailed in the following Examples.

The present invention will be further described with reference to the following specific Examples but is not to be considered limited thereto, the scope of the present invention being laid out in the appendant claims.

EXAMPLE 1

A diary supplement of the present invention was prepared having the following analysis and characteristics:

| | |
|---|---|
| Solids Content | 40.58% |
| Protein | 15.26% |
| Ca | .99% |
| P | 1.31% |
| Na | 0.59% |
| Salt | 1.52% |
| T.D.N. Total Digestible Nutrients | 26% |
| Viscosity (73° F) | 1690 – 2180 cps. |
| Specific Gravity | 1.192 |
| pH | 4.2 |
| Flow Rate | ≃125 sec. |

The supplement was produced by the process described in detail below using the following components:

| Component | % By Weight |
|---|---|
| Min-u-gel 200 | 1.00 |
| Hodag 67-48[1] | .0125 |
| Trace Mineral Premix[3] | .05 |
| Rovimix[2] | 28 gm/T |
| Molasses | 5.00 |
| Dried Wheat Solubles[4] | 4.00 |
| Salt | .75 |
| Corn Gluten Meal[5] | 8.50 |
| Corn Stepwater[6] | 30.00 |
| Yeast Slurry 16% d.m. (2% $H_3PO_4$)[7] | 47.24 |
| Phosphoric Acid 75% | 1.20 |
| Limestone | 2.25 |
| | 100.00 |

The constitution of the above components is where necessary explained more fully as follows:

[1] An antifoaming agent available from Hodag Chemical Corp., 7247 N. Central Park Avenue, Skokie, Ill. 60076, U.S.A.

[2] A vitamin additive containing vitamins A, D and E, available from Hoffmann-La Roche.

[3] This contains the following

| | |
|---|---|
| Ferrous Sulphate | 34% |
| Cupric Sulphate | 10% |
| Zinc Sulphate | 31% |
| Manganese Sulphate | 23% |
| Cobalt Sulphate | 1% |
| EDDI (ethylene diamine dihydro iodide) | 1% |

[4] Contains 20% protein on dry matter basis.
[5] Contains about 67% protein on dry matter basis.
[6] Contains 40% protein on dry matter basis.
[7] Produced according to the process described in said copending application using 2% $H_3PO_4$ over 24 hours.

Procedure

The pilot plant illustrated in Diagram A was used with the following sequence of steps:

The following liquid components were introduced into processor 10 over a period of 6.75 min.:
Yeast slurry
Corn Steepwater
Molasses
Phosphoric Acid
Hodag Antifoaming agent Both mixers were then brought into operation, whereupon the liquid mass commenced recirculating and a vortex quickly formed in the processor. The following dry components were then introduced into the vortex over a period of 9.33 minutes:
  Trace Minerals
  Wheat Solubles
  Dry Mix The whole processor contents were then recirculated for 10 min. The liquid vitamins were added at the end of the recirculation period and the mixture then discharged to product storage tank through the Gifford-Wood high-shear mixer over a period of 12 min. The resulting novel dairy supplement had the composition and characteristics detailed above.

The above procedure was repeated but with the Min-u-gel omitted from the formulation. Both the feed supplements so produced were subjected to gravitational stability tests as described previously. The results of the dry matter analysis from the four sample points were as follows.

| | | WITH MIN-U-GEL | | |
|---|---|---|---|---|
| WEEKS | A | B | C | D |
| 0 | 41.92 | 41.25 | 40.44 | 41.23 |
| 2 | 40.59 | 38.78 | 41.11 | 40.46 |
| 5 | 38.57 | 37.91 | 37.82 | 36.66 |
| 6 | 37.82 | 38.24 | 38.06 | 38.60 |

| | | WITHOUT MIN-U-GEL | | |
|---|---|---|---|---|
| WEEKS | A | B | C | D |
| 0 | 40.61 | 40.42 | 39.67 | 39.82 |
| 2 | 36.67 | 38.95 | 39.10 | 39.98 |
| 5 | 33.45 | 36.66 | 37.73 | 36.88 |
| 6 | 37.48 | 37.54 | 37.32 | 38.88 |

Note: The above figures refer to level of sample in the test vessels.

This shows that corn gluten meal functions, at this level, as an adequate water binding agent. However, the stratal variance in the case of the corn Min-u-gel combination was only 0.08 compared with a value of 0.63 for corn gluten meal alone. As mentioned, both supplements are satisfactory from a commerical view point and each easily meets the 5% gravitational stability criterion.

The Min-u-gel 200 has the following physical properites:

| Color | Gray |
|---|---|
| Free moisture, as produced % | 14 |
| pH | 8 |
| Specific gravity | 2.4 |
| Base exchange capacity milli-equivalents/100 g | 20 |
| Surface acidity, pKa | 1.5 |
| Packed Bulk Density, lb/ft³ | 45 |
| Free fall density, lb/ft³ | 35 |
| Wet screen analysis, +325 mesh, % | 5 |

Using the procedure described in detail in Example 1 the following liquid feed supplements according to the present invention were produced:

EXAMPLE 2

This is a beef supplement, the formulation used in the process being as follows:

| Component | % |
|---|---|
| Yeast Slurry (16%) | 48.95 |
| Corn Steepwater | 35.00 |
| Molasses | 5.00 |
| Phosphoric Acid | 1.00 |
| Hodag | .0125 |
| Soybean Meal (49%) | 1.34 |
| Minugel 200 | 1.00 |
| Salt | 1.50 |
| Calcium Carbonate | 2.15 |
| Dried Meat Solubles | 4.00 |
| FFP Trace Mineral Premix | .05 |

The novel beef supplement so produced had the following analysis and characteristics:

| Component | % |
|---|---|
| Solids Content | 33.78 |
| Protein | 12.12 |
| Ca | 1.84 |
| P | 2.51 |
| Salt | 1.99 |
| Viscosity (73° F) | 1133 – 1546 cps |
| Specific Gravity | 1.140 |
| pH | 4.0 |
| Flow Rate | 175 sec. |

The total batch was 4,000 lbs. weight.

EXAMPLE 3

This again is a beef supplement including in this case a source of NPN, namely, urea, the formulation used being as follows:

| Component | % |
|---|---|
| Yeast Slurry (16%) | 49.69 |
| Corn Steepwater | 26.0 |
| Molasses | 7.8 |
| Phosphoric Acid | 1.55 |
| Hodag | 0.0125 |
| Urea | 3.6 |
| Salt | 1.5 |
| Min-u-gel 200 | 1.0 |
| Calcium Carbonate | 4.75 |
| Dried Wheat Solubles | 4.00 |
| Trace Mineral Premix Rovimix | 0.10 |
| Total | 100.00 |

The novel beef supplement so produced had the following analysis and characteristics:

| Component | % |
|---|---|
| Solids Content | 38.26 |
| Protein | 20.27 |
| Ca | 2.01 |
| P | 2.95 |
| Na | 1.47 |
| Salt | 3.73 |
| NPN | 10.00 |
| Viscosity (73° F) | 1405 – 1730 cps |
| Specific Gravity | 1.160 |
| pH | 4.1 |
| Flow Rate | 190 sec. |

The novel feed supplements of the present invention are fed to livestock in a similar manner to prior art feeds, i.e. usually in combination with silage roughage etc., such as hay, cracked corn, straw, rolled barley, hay and beet pulp.

It has been found that in many cases roughage intake increases with evidence of increased digestion resulting in more efficient feed conversion by the animals. For example, 756 milking cows contained in 13 herds were fed for 20–60 days in late winter with a ration based on the novel dairy supplement of Example 1 above. The average daily milk production per cow prior to use of the novel supplement was 37 lbs. Upon commencing use of the novel supplements, average daily milk production per cow increased by an average of 3.69 lbs. Moreover, this increased milk production was attained with a reduction in total feed costs giving a net increase in revenue of between 10–20%.

There are also indictions that use of the novel feed supplement increases the butterfat production in cattle having low fat.

The amount of novel supplement fed to livestock varies widely depending on many factors, including type of animal, seaosn, etc. for example, dairy cattle each consume 5–10 lbs., usually 6–8 lbs. of supplement per day, whereas beef cattle would generally consume 1–2 lbs. per day. However, up to 18 lbs. of supplement per day have been fed to dairy cows with no harmful effect on the animals in question.

Using the same procedure as given in Example 1, the following complete hog feeds may be produced:

EXAMPLES 4–7

These are hog complete feeds having the following calculated analysis:

| Component | 4 | 5 | 6 | 7 |
| --- | --- | --- | --- | --- |
| Brewers Yeast 15% d.m. (2% H$_3$PO$_4$ killed) | 71.75 | 69.75 | 69.75 | 65.75 |
| Dried Wheat Solubles | 2.00 | 2.00 | 2.00 | 2.00 |
| Ground Corn | 20.00 | 20.00 | 20.00 | 20.00 |
| Phosphoric Acid | 0.10 | 0.10 | 0.10 | 0.10 |
| Sulphuric Acid to pH$_4$ | (1.20) | (1.20) | (1.20) | (1.20) |
| Limestone | 0.75 | 0.75 | 0.75 | 0.75 |
| Tallow | 2.00 | 2.00 | 2.00 | 2.00 |
| Swine Premix | 0.20 | 0.20 | 0.20 | 0.20 |
| Min-u-gel | 2.00 | 2.00 | — | — |
| IGP Bran | — | — | 4.00 | 8.00 |
|  | 100.00 | 100.00 | 100.00 | 100.00 |
| Analysis |  |  |  |  |
| Dry Matter | 35.0 | 36.6 | 33.0 | 32.75 |
| Protein | 6.5 | 7.1 | 7.15 | 6.93 |
| Dig. Energy | 565 | 577 | 581 | 576 |
| Calcium | 0.3 | 0.3 | 0.3 | 0.3 |
| Phosphorous | 0.25 | 0.25 | 0.27 | 0.28 |
| Salt | 0.2 | 0.29 | 0.29 | 0.29 |

The swing premix is an additive containing vitamins and trace elements, available from Miracle Feeds.

What we claim is:

1. A liquid animal feed supplement comprising a colloidal mixture having a pH below 5, and a solids content of from 30 to 50% by weight suspended in a colloidal suspension of spent brewers' yeast in an aqueous alcoholic medium and an effective amount of at least one water dispersible water-binding agent, said spent brewers'yeast having a majority of said suspended solids, said supplement being pumpable, having a viscosity of from 250 to 7000 cps at 23° C. and a flow rate of less than 5 minutes and more than 11 seconds at 20° C., and said supplement being further characterized by being gravitationally stable.

2. The animal feed supplement according to claim 1 which has a solids content of from 32.5 to 45% by weight.

3. The animal feed supplement according to claim 1 wherein the aqueous alcoholic suspension is derived from the spent brewers' yeast slurry obtained from a brewing process.

4. The animal feed supplement according to claim 1 which comprises up to 12.5% by weight of spent brewers'yeast.

5. The animal feed supplement according to claim 4 which comprises 5 to 8% by weight of spent brewers'-yeast.

6. The animal feed supplement according to claim 4 wherein the yeast is acid killed.

7. The animal feed supplement according to claim 6 wherein the yeast is sulphuric acid and/or phosphoric acid killed.

8. The animal feed supplement according to claim 1 wherein the water-binding agent is an attapulgite clay and is present in an amount of from 0.25 to 7% by weight.

9. The animal feed supplement according to claim 1 which has a pH of from 3.8 to 4.4

10. The animal feed supplement according to claim 1 which has a viscosity of from 750 to 3000 cps at 23° C and a flow rate of less than 5 minutes and more than 11 seconds at 20° C.

11. A liquid animal feed supplement comprising a colloidal mixture having a pH below 5 and a solids contents of from 30 to 50% by weight suspended in a colloidal suspension of acid killed spent brewers' yeast in an aqueous alcoholic medium and at least one water-dispersible water-binding agent, said spent brewers' yeast being a majority of said suspended solids, said supplement being pumpable, having a viscosity of from 250 to 7000 cps at 23° C. and a flow rate of less than 5 minutes and more than 11 seconds at 20° C., said total water-binding capacity of all the supplement components being equivalent to that provided by from 25.0 to 40% by weight of corn gluten meal, and said supplement being further characterized by being gravitationally stable.

12. The animal feed supplement according to claim 11 wherein the aqueous alcoholic suspension is derived from the spent brewers' yeast slurry obtained from a brewing process.

13. The animal feed supplement according to claim 11 which has a pH of from 3.8 to 4.4

14. The animal feed supplement according to claim 11 which has a viscosity of from 750 to 3000 cps at 23° C and a flow rate of less than 5 minutes and more than 11 seconds at 20° C.

15. The animal feed supplement according to claim 11 which comprises from 5 to 8% by weight of yeast.

16. A liquid animal feed supplement comprising a colloidal mixture having a pH below 5 and a solids content of from 30 to 50 percent by weight suspended in a colloidal suspension of spent brewers' yeast in an aqueous alcoholic medium and an effective amount of at least one water dispersible water-binding agent, said supplement being further characterized by being gravitationally stable, the water-binding agent, being selected from the group consisting of corn gluten meal, soybean meal, corn steepwater and dried wheat solubles, the total water-binding capacity of the supplement components being equivalent to that provided by from 25 to 40 percent by weight of corn gluten, said spent brewers'yeast being a majority of said suspended solids, and said supplement being pumpable, having a viscosity of from 250 to 700 cps at 23° C. and a flow rate of less than 5 minutes and more than 11 seconds at 20° C.

17. The animal feed supplement according to claim 16 which additionally contains an attapulgite clay water-binding agent in an amount of from 0.25 to 2 percent by weight.

* * * * *